(12) United States Patent
Chen et al.

(10) Patent No.: US 10,082,651 B2
(45) Date of Patent: Sep. 25, 2018

(54) SLIM IMAGER, ASSOCIATED SYSTEM-IN-PACKAGE, AND ASSOCIATED METHOD

(71) Applicant: OmniVision Technologies, Inc., Santa Clara, CA (US)

(72) Inventors: Teng-Sheng Chen, Hsinchu (TW); Jau-Jan Deng, Hsinchu (TW); Wei-Feng Lin, Hsinchu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 31 days.

(21) Appl. No.: 15/095,585

(22) Filed: Apr. 11, 2016

(65) Prior Publication Data
US 2017/0293115 A1    Oct. 12, 2017

(51) Int. Cl.
| | |
|---|---|
| *H04N 5/225* | (2006.01) |
| *G02B 13/00* | (2006.01) |
| *G01J 1/02* | (2006.01) |
| *H01L 31/0203* | (2014.01) |

(52) U.S. Cl.
CPC ........ *G02B 13/0085* (2013.01); *G01J 1/0204* (2013.01); *H04N 5/2252* (2013.01); *H04N 5/2253* (2013.01); *H04N 5/2254* (2013.01)

(58) Field of Classification Search
CPC . H04N 5/2252; H04N 5/2254; G02B 13/0085

USPC .................................. 348/374; 257/433–434
See application file for complete search history.

(56) References Cited

U.S. PATENT DOCUMENTS

| | | | |
|---|---|---|---|
| 4,785,338 A | 11/1988 | Kinoshita et al. | |
| 8,269,300 B2* | 9/2012 | Chien | H01L 27/14618 257/431 |
| 8,564,702 B2 | 10/2013 | Takagi et al. | |
| 8,900,904 B2* | 12/2014 | Marenco | H01L 27/14625 257/432 |
| 9,287,423 B2* | 3/2016 | Mori | H01L 27/1462 |
| 9,812,478 B2* | 11/2017 | Fan | H01L 27/14618 |
| 2014/0043513 A1 | 2/2014 | Lee et al. | |
| 2014/0211072 A1* | 7/2014 | Kokubun | G02B 13/0035 348/340 |
| 2015/0253194 A1* | 9/2015 | Van Buggenhout | G01J 5/045 250/353 |
| 2016/0013235 A1* | 1/2016 | Yee | H01L 27/14618 257/432 |

* cited by examiner

*Primary Examiner* — Ngoc-Yen Vu
(74) *Attorney, Agent, or Firm* — Lathrop Gage LLP

(57) ABSTRACT

In an embodiment, a slim imager is disclosed. The slim imager includes a substrate including an aperture, an image sensor, and an optics unit. The image sensor is on a bottom side of the substrate, spans the aperture, and has an aperture-facing top surface. The optics unit is on a top side of the substrate, spans the aperture, and includes a transmissive optical element having an aperture-facing bottom surface. A volume partially bound by the aperture-facing top surface and the aperture-facing bottom surface has a refractive index less than 1.01 at visible wavelengths.

9 Claims, 5 Drawing Sheets

SLIM IMAGER, ASSOCIATED SYSTEM-IN-PACKAGE, AND ASSOCIATED METHOD

BACKGROUND

High-volume consumer products such as mobile devices and motor vehicles often include at least one digital camera. For example, FIG. 1 is a cross-sectional view of device 190 having an imager 100 integrated therein. Imager 100 includes an image sensor 110 beneath an optics unit 170. Imager 100 and device 190 have respective heights 100H and 190H. In devices that include imager 100, height 100H can restrict a minimum attainable thickness of the device, which can reduce the device's functionality and market value. For example, height 100H may place a lower limit on the device height 190H. Hence, minimizing height 100H without sacrificing image quality can increase value and functionality of devices capable of including imager 100.

SUMMARY OF THE INVENTION

In an embodiment, a slim imager is disclosed. The slim imager includes a substrate that includes an aperture, an image sensor, and an optics unit. The image sensor is on a bottom side of the substrate, spans the aperture, and has an aperture-facing top surface. The optics unit is on a top side of the substrate, spans the aperture, and includes a transmissive optical element having an aperture-facing bottom surface. A volume partially bound by the aperture-facing top surface and the aperture-facing bottom surface has a refractive index less than 1.01 at visible wavelengths.

In an embodiment, a system-in-package is disclosed. The system-in-package includes the aforementioned slim imager, a conductor array, and a device. The conductor array is located on the bottom side of the substrate and includes a first plurality of conductors and a second plurality of conductors. The image sensor is electrically connected to each of the first plurality of conductors. The device is on the top side of the substrate and is electrically connected to each of the second plurality of conductors.

In an embodiment, a method for manufacturing a slim imager is disclosed. The method includes a step of removing a plate from a top surface of a substrate having an aperture, wherein the plate had been covering the aperture before removal. The substrate has an image sensor that is (a) bonded to a bottom surface of the substrate opposite the top surface and (b) aligned to a center of the aperture. The method also includes a step of aligning an optical axis of an optics unit to a center of the image sensor, and a step of bonding the aligned optics unit to the top surface.

DETAILED DESCRIPTION OF THE EMBODIMENTS

Figure 1:
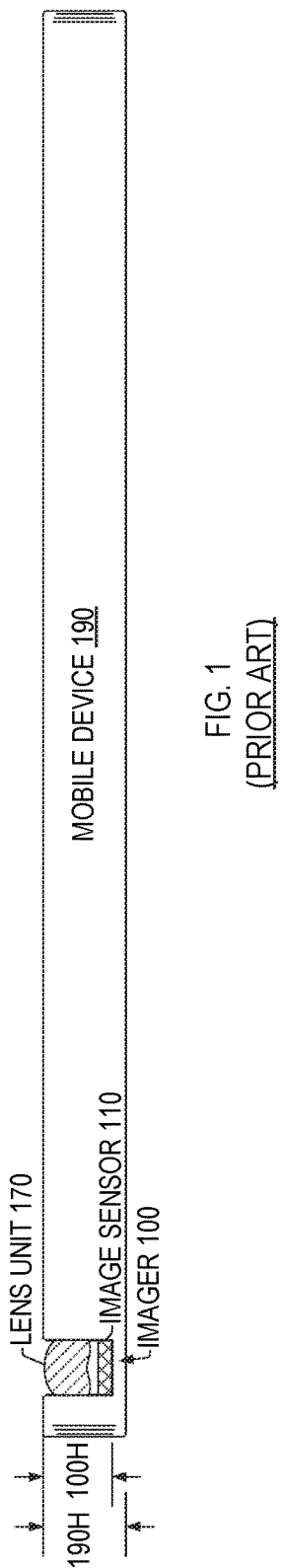
FIG. 1 is a cross-sectional view of device having an imager integrated therein.
Figure 2:
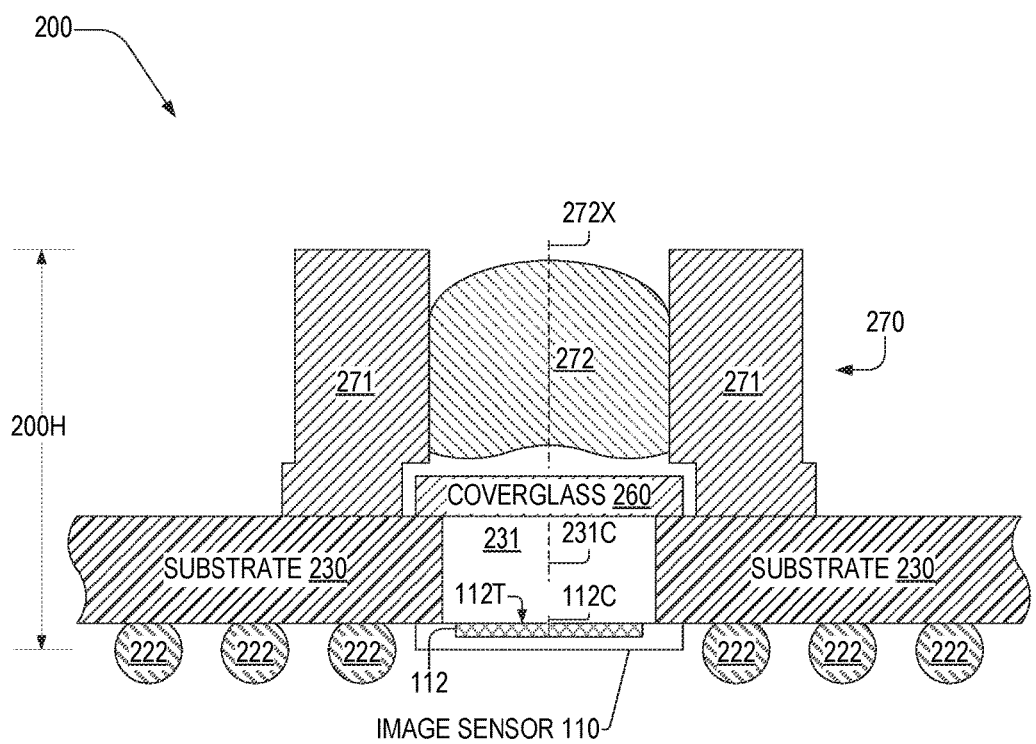
FIG. 2 is a cross-sectional view of an imager, which is an example of the imager of FIG. 1.

FIG. 2 is a cross-sectional view of an imager 200, which is an example of imager 100. Imager 200 has a height 200H and includes image sensor 110, a substrate 230, a coverglass 260, and an optics unit 270. Optics unit 270 includes a lens housing 271 and a lens 272. Lens 272 maybe a single-element lens or a multi-element lens. Substrate 230 includes a plurality of solder balls 222 electrically connected to image sensor 110. Substrate 230 also includes an aperture 231 that has a center axis 231C. Image sensor 110 includes a pixel array 112 that has a pixel-array center 112C and a top surface 112T, which for example is a top surface of a microlens array. Lens 272 has an optical axis 272X that is aligned to pixel-array center 112C. Coverglass 260 prevents contamination of top surface 112T, e.g., by ambient particulates, during fabrication of imager 200. However, after optics unit 270 is aligned to pixel array 112, coverglass 260 is no longer required for preventing contamination of pixel array 112, as optics unit 270 serves that function.

Applicant has developed techniques for protecting a pixel array from contamination during manufacturing which do not require presence of a coverglass. Applicant discloses herein a slim imager that lacks coverglass 260 and a method of manufacturing thereof while protecting pixel array 112 from contaminants via other means. Lack of coverglass 260 also allows for improved image quality.

Figure 3:
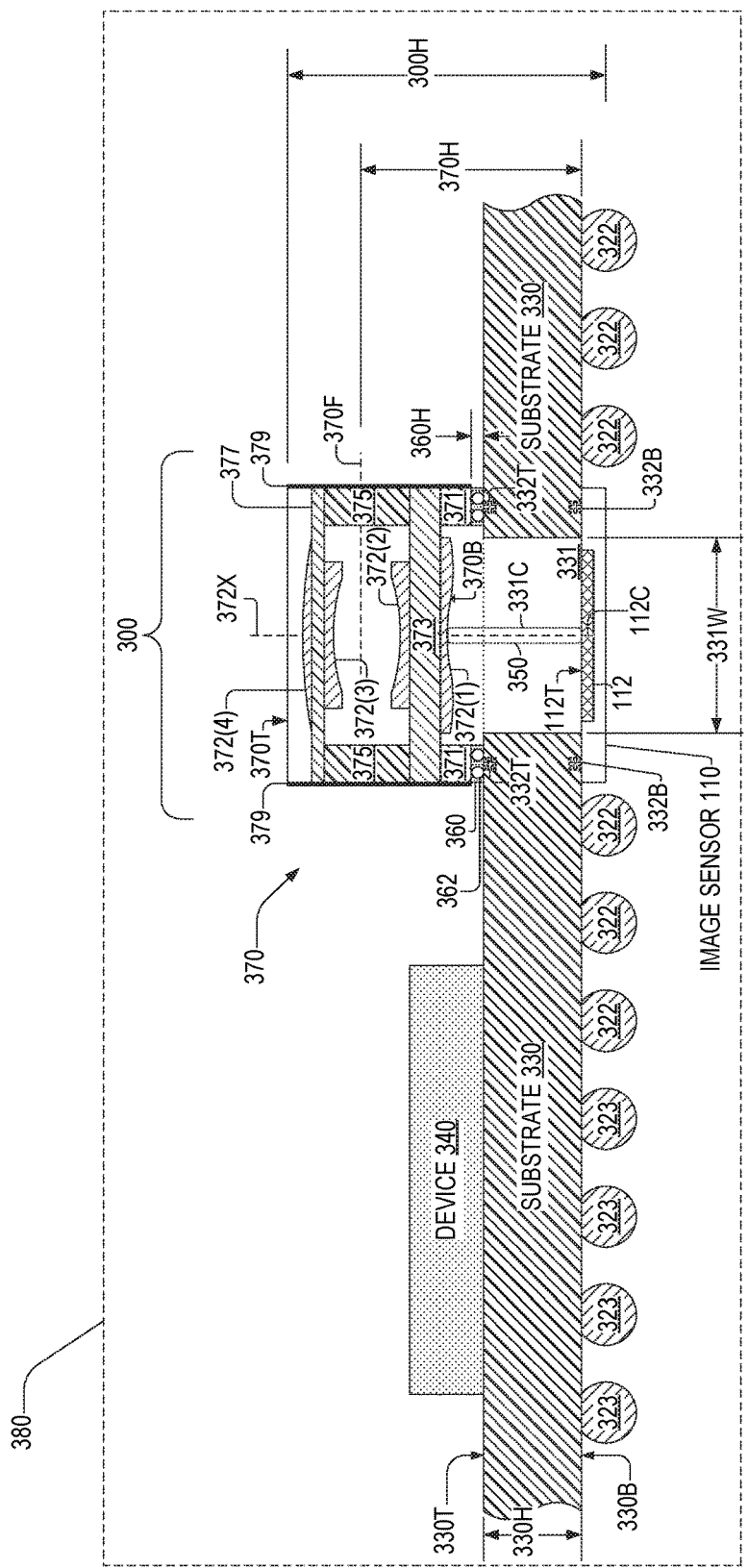
FIG. 3 is a cross-sectional view of a slim imager compatible for use as a replacement for the imager of FIG. 1, in an embodiment.

FIG. 3 is a cross-sectional view of a slim imager 300. Slim imager 300 is compatible for use in device 190 as a replacement for imager 100. Imager 300 has a height 300H and includes image sensor 110, a substrate 330, and an optics unit 370. Substrate 330 has a bottom surface 330B, a top surface 330T, and a thickness therebetween denoted by a height 330H.

Optics unit 370 is for example a wafer-level lens die, a.k.a. a wafer-level lens module. As shown, optics unit 370 includes a lower spacer 371, a lower substrate 373, an upper spacer 375, and an upper substrate 377. Optics unit 370 also includes lenses 372(1, 2) on lower substrate 373 and lenses 372(3, 4) on upper substrate 377. Lenses 372 have a common optical axis 372X. Optics unit 370 may include more or fewer lenses, substrates, and spacers without departing from the scope hereof. Optics unit 370 may also include a spectral filter.

Optics unit 370 has a flange focal length $f_{fl}$ with respect to a flange plane 370F. Optics unit 370 also includes an opaque coating 379 for preventing stray light from reaching image sensor 110. Opaque coating 379 is for example black photoresist (BPR) or chrome. Optics unit 370 includes a top surface 370T, which may include a top surface of one or more of upper substrate 377 and lens 372(4). Opaque coating 379 may extend to cover part of top surface 370T, for example, a region not directly above a clear aperture of a lens 372(4).

Optics unit 370 is compatible with surface-mount technology (SMT) reflow soldering processes by virtue of including component materials that are SMT-compatible. These materials include those that form lenses 372, spacers 373 and 375, substrates 373 and 377, opaque coating 379, and, when present, any adhesives and optical coatings of optics unit 370.

Image sensor 110 is bonded to bottom surface 330B of substrate 330 and is electrically connected to a plurality of solder balls 322 attached to substrate 330. Substrate 330 may include a redistribution layer that electrically connects image sensor 110 to solder balls 322. Substrate 330 also includes an aperture 331 that has a center axis 331C. Optics unit 370 has an optical axis 372X that is aligned to pixel-array center 112C. Center axis 331C may be aligned with pixel-array center 112C and optical axis 372X. Optics unit 370 is bonded to top surface 330T of substrate 330 by spacer glue 360. Spacer glue 360 may be opaque, black for example, to prevent stray light from reaching pixel array 112.

Spacer glue 360 has a height 360H that places flange plane 370F a height 370H above image sensor 110 that results in optimal image quality, for example, when height 370H equals flange focal length h. Optimal image equality may correspond to a merit function related to the modulation transfer function (MTF) of images that optics unit 370 forms on image sensor 110. Spacer glue 360 may include spacers 362 embedded or dispersed therein to maintain heights 370H and 360H. Spacers 362 are for example include at least one of microspheres and microrods.

Optics unit 370 has a bottom surface 370B corresponding to a bottom surface of a transmissive optical element, such as a lens or a filter, closest to image sensor top surface 112T of pixel array 112. In the embodiment of slim imager 300 of FIG. 3, bottom surface 370B is the bottom surface of lens 372(1). Bottom surface 370B is for example a non-planar surface having at least one of a convex region and a concave region.

Region 350 denotes a volume between top surface 112T and bottom surface 370B that includes at least one of center axis 331C and optical axis 372X. In an embodiment, region 350 is void of any solid or liquid material at standard ambient temperature and pressure (298.15 K, 100 kPa), such that includes only gas-phase matter (e.g., air, nitrogen, and partial vacuum). Region 350 may have a refractive index n<1.01 at visible wavelengths. Region 350 may be wider than illustrated in FIG. 3, such that its maximum width within aperture 331 equals a width 331W of aperture 331.

Substrate 330 includes a plurality of top alignment marks 332T on top surface 330T and a plurality of bottom alignment marks 332B on bottom surface 330B. One alignment mark 332T may be directly opposite an alignment mark 332B, as illustrated in FIG. 3.

FIG. 3 also includes a device 340 that is electrically connected to a conducting element attached to substrate 330, such as one or more solder balls 323. Device 340 is for example wire-bonded to bonding pads of substrate 330 that are exposed on top surface 330T, which are electrically connected to solder balls 323 via a redistribution layer of substrate 330. Alternatively, device 340 may include a ball-grid array electrically connected to conducting elements of substrate 330 that are exposed on top surface 330T. Device 340 is for example, memory, a light emitting diode (LED), or an integrated circuit such as an application-specific integrated circuit (ASIC). Slim imager 300, device 340, and substrate 330 form a system in package (SiP) 380.

Figure 4:
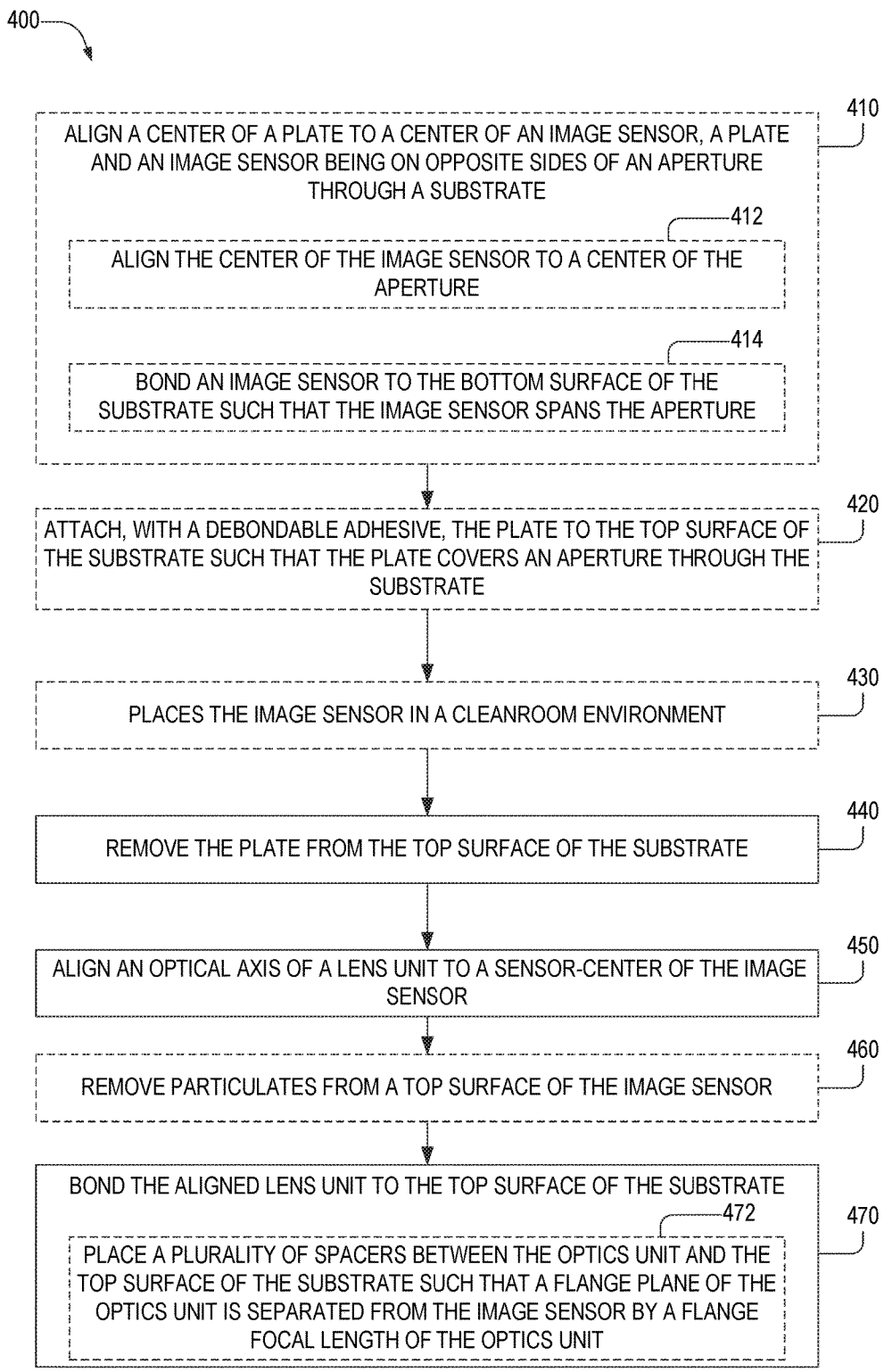
FIG. 4 is a flowchart illustrating a method for manufacturing the slim imager of FIG. 3, in an embodiment.
Figure 5:
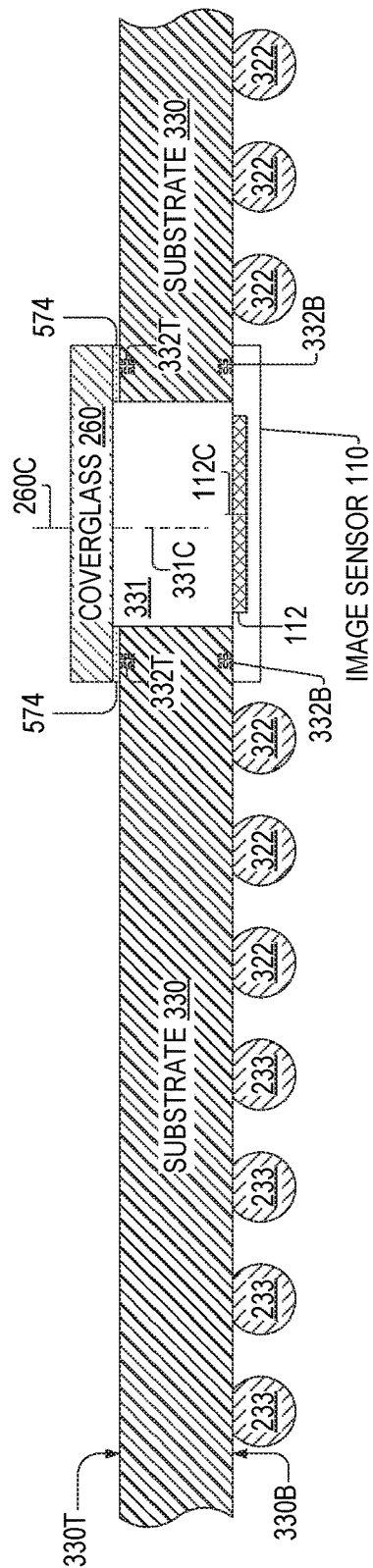
FIG. 5 is a cross-sectional view of the image sensor and substrate of the FIG. 3 slim imager, and a coverglass, for illustrating steps of the FIG. 4 method, in an embodiment.

FIG. 4 is a flowchart illustrating a method 400 for manufacturing slim imager 300. FIG. 5 is a cross-sectional view of image sensor 110, substrate 330, and cover glass 260 for illustrating steps of method 400. FIG. 4 and FIG. 5 are best viewed together with the following description.

Step 410 is optional. In step 410, method 400 aligns a center of a plate to a center of an image sensor. The plate and the image sensor are on opposite sides of an aperture through a substrate. The image sensor is bonded to the bottom surface of the substrate such that the image sensor spans an aperture. In an example of step 410, coverglass center 260C of coverglass 260 is aligned to pixel-array center 112C of pixel array 112.

Step 410 may include step 412. In step 412, method 400 aligns the center of the image sensor to a center of the aperture. In an example of step 412, pixel-array center 112C of pixel array 112 is aligned to center axis 331C of aperture 331.

Step 410 may include step 414. In step 414, method 400 bonds the image sensor to the bottom surface of a substrate such that the image sensor spans an aperture through the substrate. In an example of step 414, image sensor 110 is bonded to bottom surface 330B of substrate 330 such that image sensor 110 spans aperture 331, as shown in FIGS. 3 and 5.

Step 420 is optional. In step 420, method 400 attaches, with a debondable adhesive, the plate to the top surface of a substrate such that the plate covers an aperture through the substrate. In an example of step 420, coverglass 260 is attached to top surface 330T of substrate 330 via a debondable adhesive 574, as shown in FIG. 5. Adhesive 574 is for example a UV-release adhesive tape, a thermal-release debondable adhesive, or an adhesive soluble by a specific liquid, such as water. Step 420 may follow or precede step 414.

Step 430 is optional. In step 430, method 400 places the image sensor in a cleanroom environment to prevent particulates from reaching pixel array 112. In an example of step 430, substrate 330 and image sensor 110 attached thereto are placed in a cleanroom that meets or exceeds particle-count requirements of an ISO 3 class cleanroom, which is equivalent to class 1 cleanroom per, US FED STD 209E.

In step 440, method 400 removes the plate from the top surface of the substrate. In an example of step 440, coverglass 260 is removed from top surface 330T. Step 440 may include a debonding process as known in the art, for example, exposing adhesive 574 to ultraviolet light (or other wavelengths) or applying heat to adhesive 574.

In step 450, method 400 aligns an optical axis of an optics unit to the sensor-center. In an example of step 450, optical axis 372X of optics unit 370 is aligned to pixel-array center 112C of pixel array 112. (See FIG. 3). Step 450 may include recognizing a pattern on pixel array 112 to align optics unit 370 to pixel array 112. Step 450 may be performed before or after step 440.

Step 460 is optional. In step 460, method 400 removes particulates from a top surface of the image sensor. In an example of step 460, particulates are removed from top surface 112T of pixel array 112, which is a top surface of image sensor 110. Step 460 may be performed using a compressed high-purity gas, such as nitrogen.

In step 470, method 400 bonds the aligned optics unit to the top surface of the substrate. In an example of step 470, optics unit 370 is bonded to top surface 330T of substrate 330 with spacer glue 360. Step 470 may include an optional step 472. In step 472, method 400 places a plurality of spacers between the optics unit and the top surface of the substrate such that a flange plane of the optics unit is separated from the image sensor by a flange focal length of the optics unit. The spacers are embedded or dispersed within an adhesive that bonds the aligned optics unit the top surface of the substrate. In an example of step 472, spacers 362 are placed between optics unit and top surface 330T such that flange plane 370F is separated from the image sensor 112 by a height 370H equal to flange focal length $f_{fl}$ of optics unit 370.

Combinations of Features

Features described above as well as those claimed below may be combined in various ways without departing from the scope hereof. The following examples illustrate some possible, non-limiting combinations:

(A1) A slim imager includes a substrate that includes an aperture, an image sensor, and an optics unit. The image sensor is on a bottom side of the substrate, spans the aperture, and has an aperture-facing top surface. The optics unit is on a top side of the substrate, spans the aperture, and includes a transmissive optical element having an aperture-facing bottom surface. A volume partially bound by the aperture-facing top surface and the aperture-facing bottom surface has a refractive index less than 1.01 at visible wavelengths.

(A2) In a slim imager denoted by (A1) the volume may include, at standard ambient pressure and temperature, only gas-phase matter.

(A3) In a slim imager denoted by one of (A1) and (A2), the aperture-facing bottom surface may be non-planar.

(A4) In a slim imager denoted by one of (A1) through (A3), the optics unit may be compatible with surface-mount technology reflow soldering processes.

(A5) In a slim imager denoted by one of (A1) through (A4), in which the substrate has a first thickness around the perimeter of the aperture, the optics unit may be bonded to the top side by a top adhesive, the image sensor may be bonded to the bottom side by a bottom adhesive, the top adhesive, the first substrate thickness, and the bottom adhesive may define a thickness between the optics unit and the image sensor.

(A6) In a slim imager denoted by one of (A1) through (A5), the substrate may include a plurality of bottom alignment marks on the bottom side and a respective plurality top alignment marks on the top side. Each top alignment mark may be directly opposite a respective bottom alignment mark. The image sensor may be aligned with the plurality of bottom alignment marks. The optics unit may be aligned with the plurality of top alignment marks.

(B1) A system-in-package includes the slim imager denoted by one of (A1) through (A6), a conductor array, and a device. The conductor array is located on the bottom side of the substrate and includes a first plurality of conductors and a second plurality of conductors. The image sensor is electrically connected to each of the first plurality of conductors. The device is on the top side of the substrate and is electrically connected to each of the second plurality of conductors.

(C1) A method for manufacturing a slim imager includes a step of removing a plate from a top surface of a substrate having an aperture, wherein the plate had been covering the aperture before removal. The substrate has an image sensor that is (a) bonded to a bottom surface of the substrate opposite the top surface and (b) aligned to a center of the aperture. The method also includes a step of aligning an optical axis of an optics unit to a center of the image sensor, and a step of bonding the aligned optics unit to the top surface.

(C2) A method denoted by (C1) may also include, prior to the step of removing, attaching, with a debondable adhesive, the plate to the top surface of the substrate such that the plate covers the aperture.

(C3) A method denoted by one of (C1) and (C2) may also include bonding the image sensor to the bottom surface of the substrate such that the image sensor spans the aperture.

(C4) A method denoted by one of (C1) through (C3) may further include, prior to the step of removing, placing the image sensor in a cleanroom environment.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A slim imager comprising:
   a substrate having an aperture and a first substrate thickness around a perimeter of the aperture;
   an image sensor bonded, by a bottom adhesive, to a bottom side of the substrate, spanning the aperture, and having an aperture-facing top surface; and
   an optics unit bonded, by a top adhesive, to a top side of the substrate, spanning the aperture, and including a transmissive optical element having an aperture-facing bottom surface,
   the top adhesive, the first substrate thickness, and the bottom adhesive defining a thickness between the optics unit and the image sensor, and
   wherein a volume partially bound by the aperture-facing top surface and the aperture-facing bottom surface has a refractive index less than 1.01 at visible wavelengths.

2. The slim imager of claim 1, the volume including, at standard ambient pressure and temperature, only gas-phase matter.

3. The slim imager of claim 1, the aperture-facing bottom surface being non-planar.

4. The slim imager of claim 1, the optics unit being compatible with surface-mount technology reflow soldering processes.

5. The slim imager of claim 1, the substrate including a plurality of bottom alignment marks on the bottom side and a respective plurality top alignment marks on the top side, each top alignment mark being directly opposite a respective bottom alignment mark, the image sensor being aligned with the plurality of bottom alignment marks, and the optics unit being aligned with the plurality of top alignment marks.

6. A system-in-package comprising:
   a substrate having an aperture and a first substrate thickness around a perimeter of the aperture;
   a conductor array (i) located on a bottom side of the substrate and (ii) including a first plurality of conductors and a second plurality of conductors;
   an image sensor bonded, by a bottom adhesive, to the bottom side of the substrate, spanning the aperture, having an aperture-facing top surface, and being electrically connected to each of the first plurality of conductors;
   a device on a top side of the substrate and electrically connected to each of the second plurality of conductors;
   an optics unit bonded, by a top adhesive, to the top side of the substrate, spanning the aperture, and including a transmissive optical element having an aperture-facing bottom surface,
   the top adhesive, the first substrate thickness, and the bottom adhesive defining a thickness between the optics unit and the image sensor,
   wherein a volume bound by the aperture-facing top surface and the aperture-facing bottom surface has a refractive index less than 1.01 at visible wavelengths.

7. The system-in-package of claim 6, the volume including only gas-phase matter at standard ambient pressure and temperature.

8. The system-in-package of claim 6, the optics unit being compatible with surface-mount technology (SMT) reflow soldering processes.

9. The system-in-package of claim 6, the substrate including a plurality of bottom alignment marks on the bottom side and a respective plurality top alignment marks on the top side, each top alignment mark being directly opposite a respective bottom alignment mark, the image sensor being aligned with the plurality of bottom alignment marks, and the optics unit being aligned with the plurality of top alignment marks.

* * * * *